United States Patent [19]

Ramm

[11] Patent Number: 5,141,681
[45] Date of Patent: Aug. 25, 1992

[54] PROCESS AND APPARATUS FOR THE PRODUCTION OF A PACKING SHEET ON A CALENDER

[75] Inventor: Hans F. Ramm, Hemmingen, Fed. Rep. of Germany

[73] Assignee: Paul Troester Maschinenfabrik, Hanover, Fed. Rep. of Germany

[21] Appl. No.: 681,996

[22] Filed: Apr. 8, 1991

[30] Foreign Application Priority Data

Apr. 9, 1990 [DE] Fed. Rep. of Germany ....... 4011427

[51] Int. Cl.⁵ .................... B29C 43/24; B29C 43/46; B29C 43/58
[52] U.S. Cl. .................... 264/40.1; 100/47; 100/48; 100/168; 100/172; 264/40.6; 264/175; 425/141; 425/143; 425/367
[58] Field of Search ............ 264/40.1, 40.5, 40.6, 264/175; 425/141, 143, 149, 367; 100/47, 48, 168, 172

[56] References Cited

U.S. PATENT DOCUMENTS 3,074,114  1/1963  Petry ............................. 264/175
3,182,587  5/1965  Woodhall ....................... 425/143
4,639,346  1/1987  Pav et al. ..................... 264/40.6 X

*Primary Examiner*—Leo B. Tentoni
*Attorney, Agent, or Firm*—Robert E. Burns; Emmanuel J. Lobato

[57] ABSTRACT

A calender for producing packing sheets has a heated cylinder of large diameter and an unheated pressure cylinder of smaller diameter which is movable toward and away from the heated cylinder to vary the width of a gap between the cylinders. A plastic mixture plasticized by a solvent is fed to the gap between the cylinders and is formed into a sheet on the heated cylinder, where it is vulcanized. Two temperature sensors on a common support are positioned to measure the temperature of the outer surface of such sheet and transmit the temperature measurement to a procesor which is programmed to control operations of the calender. A further sensor measures the thickness of the sheet on the heated cylinder and the thickness measurement is transmitted to the processor as a further parameter in control of operation of the calender.

9 Claims, 1 Drawing Sheet

PROCESS AND APPARATUS FOR THE PRODUCTION OF A PACKING SHEET ON A CALENDER

FIELD OF THE INVENTION

The invention relates to a process and an apparatus for the production of a packing sheet on a calender which has a heated cylinder of large diameter and an unheated pressure cylinder of small diameter and has control apparatus for controlling the speed of the motors driving the cylinders and controlling the temperature of the heated cylinder and the pressure cylinder, whereby a raw mixture of rubber and solvent s fed to a gap between the cylinders and through temperature control, dependent on time and the rate of rotation of the heated cylinder, is formed into a sheet on the heated cylinder where it is vulcanized.

BACKGROUND OF THE INVENTION

For the production of fiber reinforced flat gaskets, which are needed in numerous applications in the technical field, there is used a so called packing sheet calender which has a large diameter heated cylinder, on which the sheet is formed and vulcanized, and a cooled cylinder of smaller diameter which serves as a pressure cylinder for the construction and is usually hydraulically pressed toward the heated cylinder.

The gaskets are thereby produced from a mixture of rubber rendered workable by a solvent and fiber which gives the finished product its strength. Traditionally asbestos fiber was used as the reinforcing fiber since the production and use of the gasket excluded other fibers on thermal grounds. However in recent times asbestos has become increasingly undesirable for reasons of health, and, in so far as possible, is replaced by high strength and thermal resistant synthetic fiber.

On the precision of the roundness of the cylinders, the quality of the cylinder surfaces, the temperature and its exactness, the uniformity of the cylinder pressure and, above all, also the exactness of the speed of rotation of the cylinders (synchronism), the use of synthetic fibers imposes extremely high requirements.

In the production of packing sheets on the calender there are, in addition to the aforementioned machine characteristics, still numerous details which influence the production, for example:

the temperature of the heated cylinder. It is controlling for the vulcanization and thereby for the speed of production of the sheet.

The exactness of the temperature. This is significant with reference to the uniformity of the vulcanization.

The operating speed of the cylinders. It depends on different parameters as for example the adhesion of the mass on the cylinder surface and, depending on the rate of vulcanization and the number of passes under the pressure cylinder in a cycle, determines the compression and quality of the sheets.

The pressure of the pressing cylinders at opposite ends of the pressing cylinder. It is important for the uniformity of thickness of the sheet produced.

The line pressure of the pressing cylinder. It is decisively important for the compression of the sheet.

Correction of cylinder bending. For the production of optimal conditions there is provided a counter bending device which is adjusted to correspond to the pressing force.

The pressing force. It must be optimized with respect to the mixture from which the sheet is formed and the sheet thickness.

The adjustment of circumferential speed of the two individually driven cylinders to one another, which normally must be precisely the same but occasionally may be very slightly different to apply a precisely adjusted friction to the sheet.

The feeding of the mass in relation to the amount and the optimal distribution over the length of the cylinder gap, whereby the uniformity of the sheet tolerance over the working width of the sheet is assured.

An alteration of the parameters after the beginning of the sheet production increasing sheet thickness, for example of the pressure of the pressing cylinder, the speed of vulcanization with decreasing thickness, the number of over-rollings etc.

With the traditional material of the packing sheet, thus with asbestos fiber reinforcing, it was sufficient for most part with reference to carrying out this complicated work process to make the initial adjustment and the running corrections of the production parameters by a service man who also attended to the feeding of the calender and, on the basis of his experience, optimized all other values as required.

By reason of the promotion of asbestos free packing sheets and hence the required introduction of high strength temperature resistant synthetic fibers, working with the mixture has become much more difficult. In particular the discovery and the checking of optimal working parameters has become, in part, so problematic that only specially experienced service people are in a position to produce satisfactory packing sheet. In spite of this, in the production of packing sheets there is much waste which is not commercially acceptable.

SUMMARY OF THE INVENTION

The invention overcomes the objections of the state of the art. The invention is directed to the problem of providing better adapted control of the production process of producing packing sheets, in particular synthetic fiber reinforced packing sheets, with which a constant high quality of the packing sheets produced is attained.

The invention achieves this by providing on the circumference of the heated cylinder at least one temperature measuring position for measuring the outer surface temperature of a packing sheet formed on the heated cylinder and using this measured temperature as a basis for other control measures.

In the production of packing sheets in accordance with the present invention, the temperature of the outer face of a packing sheet formed on the heated cylinder is constantly measured during the entire production process and, depending on this temperature, the temperature of the heated cylinder, the number of rotations of the heated cylinder, the speed of rotation of the heated cylinder and/or the cold cylinder, the pressure force applied to the pressure cylinder, the feed of the raw mixture and/or the feed of the solvent on the packing sheet outer face are controlled.

As the mass to be processed consists of a plastic material mixture, rendered workable by means of a solvent, which is mixed with the temperature resistant synthetic fiber, which in the finished packing sheets imparts strength, the solvent evaporates when this mass, after being brought onto the heated cylinder of the calender is warmed. This process occurs during the continuous rotary movement of the heated cylinder by which the pressure cylinder effects a corresponding number of over rollings for a compacting of the mass in spite of this evaporation. Thereby the important phase of the vulcanization of the sheet begins only after full evaporation of the solvent particles as it is only then that a temperature can be reached which is necessary for the vulcanization. The process control in accordance with the invention now takes place in dependence on the outer surface temperature of the packing sheet being produced so that the best possible adjustment of the phase of the solvent evaporation and the beginning of the vulcanization can occur, so that through this control on the basis of the outer surface temperature the optimal operation process can be attained.

It is advantageous when the thickness of the sheet produced is used as a second determinative parameter in the control of the production process.

To optimize the work process, it is advantageous when the work cycle of the calender is controlled through a programmed processor which controls the individual operation steps in dependence on the temperature of the outer surface of the packing sheet being produced as a process controlling parameter and on the thickness of the packing sheet being produced as a second parameter. The remaining process determining parameters will then be integrated by the processor.

The process data stored in the operation recipe are, in accordance with the invention, modified according to theoretically or empirically attained functions or formulas according to the outer surface temperature of the mass so that this mass temperature is set and held at a constant value. Hereby are particularly the number of cylinder revolutions, the speed difference of the two cylinders (friction), the pressure force and thereby also the counter bending of the pressure cylinder included in the further process control.

It is advantageous to arrange several temperature measuring feelers on a common carrier which is arranged parallel to the heated cylinder outer surface and to the axis of the heated cylinder in the calender frame. Through the use of several temperature measuring feelers, any inequality of the temperatures can be controlled for example through applying additional solvent to the outer surface, thereby making it possible to produce packing sheets of the highest quality and of uniform quality.

BRIEF DESCRIPTION OF DRAWINGS

The essence of the invention will be more fully understood from the description of a preferred embodiment shown by way of example in the accompanying drawings in which.

DESCRIPTION OF PREFERRED EMBODIMENT

Figure 1:
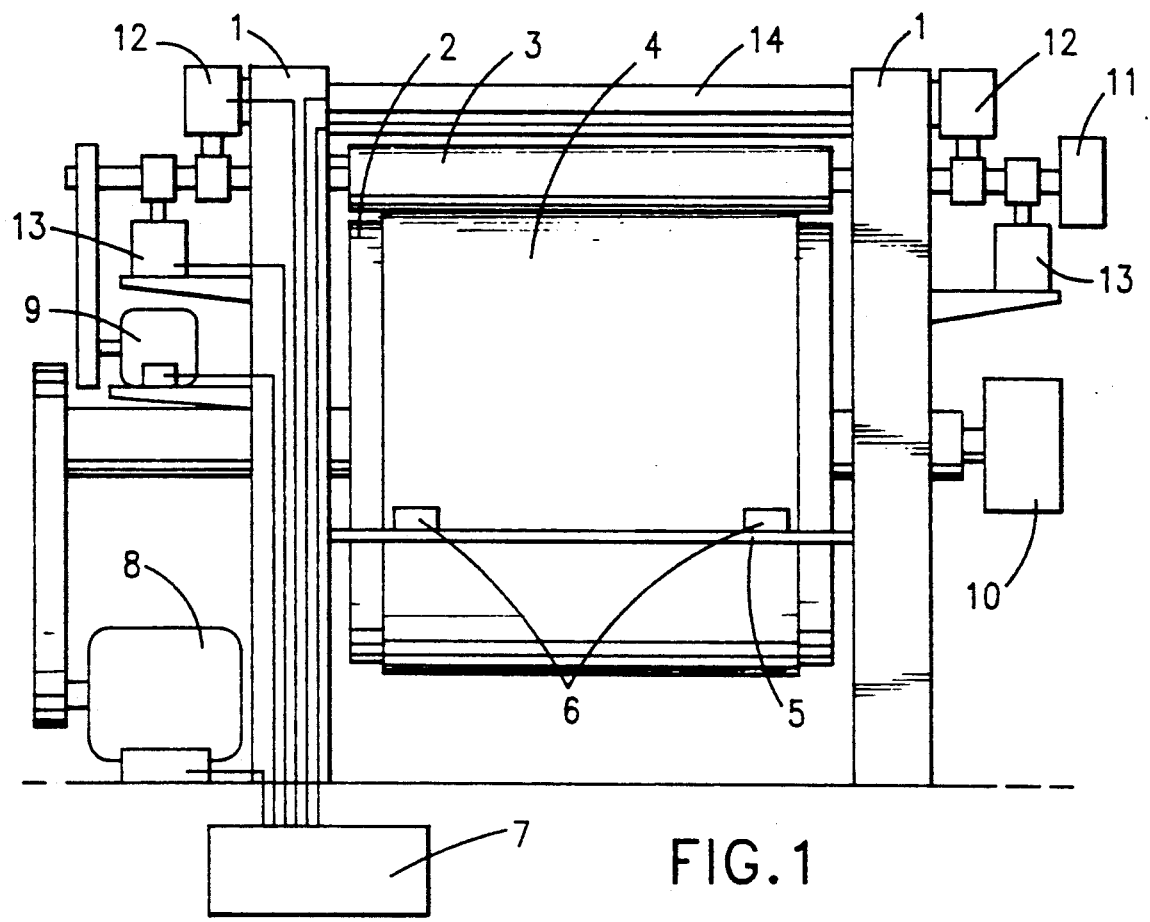
FIG. 1 is a schematic front elevation of a calender in accordance with the invention and, FIG. 2 is a schematic side elevation of the calender with one calender stand removed for clarity of illustration.
Figure 2:
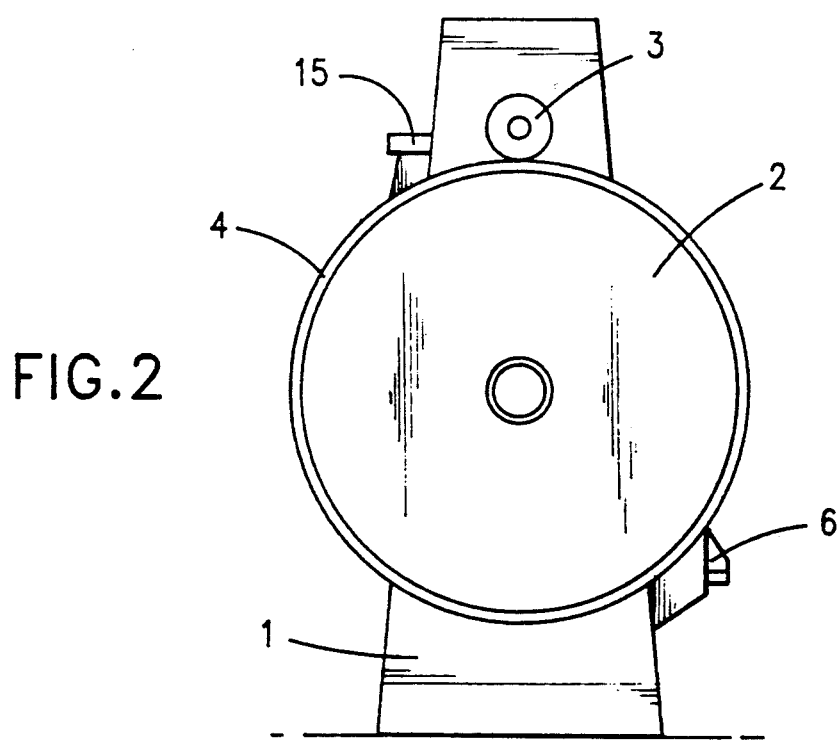

A heated cylinder 2 and pressure cylinder 3 are rotatably supported by calender stands 1 with a gap between them. Bearings supporting the shaft of the heated cylinder 2 are stationary in the calender stands while bearings supporting the shaft of the pressure cylinder 3 are movable toward and away from the bearings of the heated cylinder 2 so as to vary the gap between the cylinders. The pressure cylinder 3 is hydraulically pressed toward the heated cylinder 2.

In the gap between the cylinders there is fed by a feeding device 14, a plastic mixture made workable by means of a solvent which is formed as a sheet-like layer of the packing sheet 4 to be produced on the heated cylinder 2. The pressure cylinder 3 is pressed against the sheet 4 thus formed on the heated cylinder 2 and compacts it. As plastic mixture is added during successive revolutions of the heated cylinder and the thickness of the sheet is thus increased, the pressure cylinder is moved away from the heated cylinder by a distance corresponding to the thickness of the sheet. The position of the axis of the pressure cylinder, and thus the thickness the sheet, is sensed by a sensor 15.

On the calender stands 1 there is arranged a carrier 5 for temperature measuring feelers 6 for measuring the temperature of the outer surface of the sheet formed on the heated cylinder. The carrier 5 is in the form of a rod or bar which extends parallel to the axis of the heated cylinder and supports the temperature measuring feelers 6, which are spaced apart on the rod or bar, in position to measure the temperature of the outer surface of the sheet. The temperature measuring feelers 6 are connected with inputs of a processor 7 which has further inputs for connection to other sensors including the sensor 15 for measuring the thickness of the sheet, the rotation count of the heated cylinder and the circumferential speed of the cylinders, among others. On the outputs of the processor 7 are connected control lines which run to means for controlling the speed of driving motors 8 and 9 of the heated cylinder and pressure cylinder as well as to the means 10 for supplying a heating medium to the heated cylinder or to a control valve of this heating medium and to means 11 for supplying a cooling medium to the pressure cylinder 3 or a control valve for this cooling medium, to the pressure device 12 for pressing a pressure cylinder 3 toward the heated cylinder 2 and the counter bending device 13 for counteracting the bending of the pressure cylinder and optionally to other devices, for example the charging or feeding device 14.

The processor controls the work process of the apparatus in dependence on the temperature of the outer surface of the sheet on the heated cylinder as measured by the temperature measuring feelers 6 and on the thickness of the sheet as measured by the sheet thickness measuring sensor 15.

What I claim is:

1. In a process for the production of packing sheets on a calender which comprises a heated cylinder of large diameter and an unheated cylinder of smaller diameter spaced apart to provide between said cylinders a gap into which a raw mixture plasticized with a solvent is fed to form on said heated cylinder a sheet of material which progressively increases in thickness during successive revolutions of said cylinders, said calender comprising means for controlling the temperature of the heated cylinder, means for controlling the number of revolutions of the heated cylinder, means for controlling the speed of rotation of the heated cylinder and the unheated cylinder and means for pressing said unheated cylinder toward said heated cylinder with controllable force, the improvement which comprises, constantly throughout the production process, measuring the thickness of said sheet being formed on said heated cylinder and measuring the temperature of the outer surface of said sheet and in dependence on said thickness and said temperature measurements, controlling the temperature of the heated cylinder, the number of rotations of the heated cylinder, the speed of rotation of said heated cylinder and the force with which said unheated cylinder is pressed toward said heated cylinder.

2. A process according to claim 1, in which the thickness of said sheet on said heated cylinder is measured by sensing the position of an axis of said unheated cylinder relative to an axis of said heated cylinder.

3. Process according to claim 1, in which said temperature measurement and thickness measurement are fed to inputs of a processor which is programmed to control the operation of the calender in producing packing sheets.

4. Process according to claim 3, in which said processor is programmed to control the rotation of said heated cylinder and the force with which said unheated cylinder is pressed toward said heated cylinder.

5. Process according to claim 3, in which said processor is further programmed to regulate the temperature of said heated cylinder.

6. In a calender for the production of a packing sheet, comprising a heated cylinder of large diameter, an unheated pressure cylinder of smaller diameter movable toward and away from said heated cylinder to vary the width of a gap between said cylinders, motors for driving said cylinders and means for controlling said driving motors and for controlling the temperature of said heated cylinder and pressure cylinder, the improvement which comprises at least one temperature sensor positioned to measure the temperature of the outer surface of a sheet formed on said heated cylinder, means for measuring the thickness of said sheet and means for controlling operations of said calender in accordance with the temperature measured by said temperature sensor and thickness measured by said thickness measuring means.

7. A calender according to claim 6, further comprising a processor having an input to which the temperature measured by said temperature sensor and thickness measured by said thickness measuring means and fed and having outputs connected to said means for controlling said driving motors, said processor being programmed to control operation of said calender.

8. A calender according to clam 6, in which a plurality of temperature sensors are arranged on a common carrier extending parallel to the axis of said heated cylinder.

9. A calender according to claim 6, in which said means for measuring the thickness of said sheet on said heated cylinder comprises means for sensing the position of said unheated cylinder relative to the position of said heated cylinder.

* * * * *